(12) United States Patent
Cha et al.

(10) Patent No.: US 9,454,376 B2
(45) Date of Patent: Sep. 27, 2016

(54) PIPELINED PROCESSOR

(71) Applicant: Advanced Digital Chips Inc., Gyeonggi-do (KR)

(72) Inventors: Young Ho Cha, Gyeonggi-do (KR); Kwang Ho Lee, Gyeonggi-do (KR); Kwan Young Kim, Gyeonggi-do (KR); Byung Gueon Min, Gyeonggi-do (KR)

(73) Assignee: ADVANCED DIGITAL CHIPS INC., Gyeonggi-Do (KR)

( * ) Notice: Subject to any disclaimer, the term of this patent is extended or adjusted under 35 U.S.C. 154(b) by 672 days.

(21) Appl. No.: 13/895,937

(22) Filed: May 16, 2013

(65) Prior Publication Data

US 2014/0258682 A1    Sep. 11, 2014

(30) Foreign Application Priority Data

Mar. 8, 2013   (KR) .................. 10-2013-0024970

(51) Int. Cl.
*G06F 9/30* (2006.01)
*G06F 7/38* (2006.01)
*G06F 9/38* (2006.01)

(52) U.S. Cl.
CPC ........... *G06F 9/3814* (2013.01); *G06F 9/3804* (2013.01)

(58) Field of Classification Search
CPC .............................. G06F 9/382; G06F 9/3822
See application file for complete search history.

(56) References Cited

U.S. PATENT DOCUMENTS

| | | | |
|---|---|---|---|
| 2001/0016903 A1* | 8/2001 | Tremblay | G06F 9/3844 712/239 |
| 2007/0022277 A1* | 1/2007 | Iwamura | G06F 9/30181 712/229 |
| 2009/0089602 A1* | 4/2009 | Bose | G06F 1/206 713/340 |

OTHER PUBLICATIONS

"Chapter 8: Pipelining Design Techniques." http://lyle.smu/edu/~rewini/8383/pip8.pdf (2004), pp. 1-33.
Radhakrishnan, et al. (2006) "Customization of application specific heterogeneous multi-pipeline processors." *Proceedings of the conference on Design, Automation and Test in Europe, 2006*, pp. 1-6.

\* cited by examiner

*Primary Examiner* — Hyun Nam
(74) *Attorney, Agent, or Firm* — Harness, Dickey & Pierce, P.L.C.

(57) ABSTRACT

Provided is a processor with a multi-pipeline fetch structure or a multi-cycle cache structure, including: an integer core which reads instruction transmitted from a lower block, executes an operation corresponding to the instruction, and transmits an instruction address to the lower block; an instruction buffer which stores instruction data which are requested by the integer core by using the instruction address and transmits the instruction data in response to the request of the integer core; and an instruction cache which stores a portion of data of a program memory and transmit the data to the instruction buffer in response to the request of the instruction buffer.

8 Claims, 7 Drawing Sheets

PIPELINED PROCESSOR

CROSS REFERENCES TO RELATED APPLICATIONS

This application claims priority to Korean Patent Application No. 10-2013-0024970, filed in the Korean Patent Office on Mar. 8, 2013, the entire contents of which are incorporated herein by reference.

FIELD

The present invention relates to a pipelined architecture processor, and more particularly, a processor with a multi-pipeline fetch structure or a multi-cycle cache structure.

BACKGROUND

A pipelined architecture is an architecture for design of a computer system of performing parallel processes. In this design architecture, one processor is divided into several sub-processors having different functions, which are simultaneously performed to process different data. In general, in a computer, instructions are processed through five stages of fetching, analyzing, content-fetching, executing, and storing stages, and thus, the instructions are processed by the computer processor in the input order thereof step by step. However, in the pipelined architecture, since the instructions can be processed in parallel, the processing rate can be increased.

In the pipelined architecture, a time taken for completing five stages with respect to one instruction is defined by an instruction cycle; and a time taken at each stage is defined by a pipeline cycle. If the pipeline cycle is maintained constant, the five stages can be operated synchronously, so that it is possible to easily control the computer system. In order to design the pipelined architecture so that the pipeline cycles are equal, the stage having the longest time is set as a reference stage. In the case where the pipeline cycles are not constant, buffers are installed between the stages so that the stages continue to be operated asynchronously.

In some cases, the pipelined architecture may be divided into instruction pipelines and arithmetic pipelines. The instruction pipeline denotes a stage where instructions are moved through the processor. In the stage of the instruction pipeline, fetching, buffer storing, and execution are included. The arithmetic pipeline denotes a portion of calculation arithmetic which can be divided and overlappedly executed. On the other hand, according to a memory stage system, the pipeline architecture may be adapted to a memory controller which moves data to several locations.

SUMMARY

The present invention is to provide a processor with a pipeline structure including an instruction buffer for increasing efficiency of a multi-cycle cache in the processor.

The present invention is also to provide a method of controlling an instruction buffer for increasing efficiency of a multi-cycle cache.

The present invention is not limited to the above-described objects, but the other objects may be clearly understood from the following description by the ordinarily skilled in the art.

According to an aspect of the present invention, there is provided a processor with a multi-pipeline fetch structure or a multi-cycle cache structure, including: an integer core which reads instruction transmitted from a lower block, executes an operation corresponding to the instruction, and transmits an instruction address to the lower block; an instruction buffer which stores instruction data which are requested by the integer core by using the instruction address and transmits the instruction data in response to the request of the integer core; and an instruction cache which stores a portion of data of a program memory and transmit the data to the instruction buffer in response to the request of the instruction buffer.

In the above aspect, the processor may further include an instruction bus interface unit which changes an internal interface into a bus interface in order to directly access the program memory.

In addition, the processor may employ a prefetching method of filling the instruction buffer with data in advance before the requesting of the integer core.

In addition, the processor may check an empty area of the instruction buffer and use a prefetching method to fill the empty area.

In addition, when areas of the instruction buffer which can be sequentially accessed with reference to a currently-accessed area are defined by sliding windows, the processor may use the prefetching method where the sliding windows are designated and the checking is performed.

According to the present invention, in a processor with a multi-pipeline fetch structure or a multi-cycle cache structure, an instruction buffer is additionally installed between an integer core and an instruction cache, so that it is possible to improve performance of the processor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, embodiments of the present invention will now be described more fully with reference to the accompanying drawings. First, it should be noted that, among figures in the drawings, the same reference numerals denote the same elements although the elements are differently illustrated. In addition, when it is determined that the invention may become unclear due to detailed description of well-know configurations or functions, the detailed description may be omitted. In addition, in the overall description, "some portion includes some components" denote that some portion may further include other components if there is no contrary description, but it does not denote that other components are excluded.

In general, in order to increase a rate of a processor, the processor is embodied with a pipeline structure.

Figure 1:
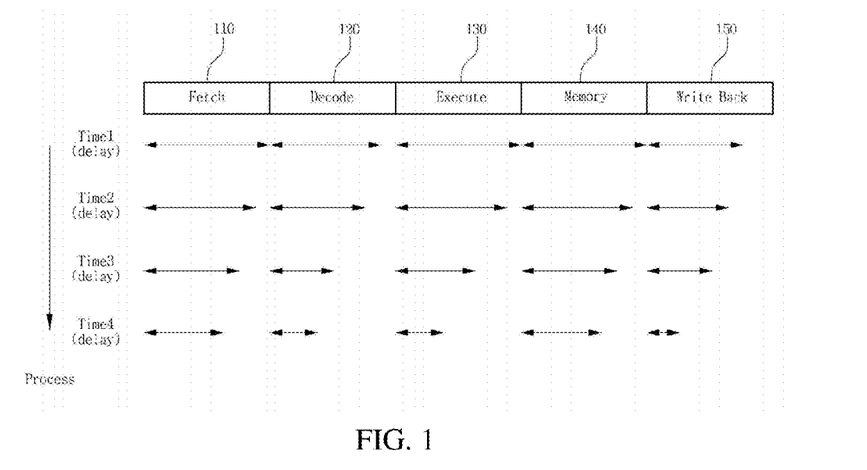
FIG. 1 is a diagram illustrating a pipeline structure of a processor.

FIG. 1 is a diagram illustrating a pipeline structure of a processor. FIG. 1 illustrates a general five-stage pipeline structure.

Referring to FIG. 1, a pipelined processor is configured to include a fetch stage 110, a decode stage 120, an execute stage 130, a memory stage 140, and a write-back stage 150.

The fetch stage 110 is an instruction fetch (IF) stage which access an instruction memory to fetch an instruction. The most basic configuration of the fetch stage 110 is to directly fetch the instruction from the instruction memory.

Generally, in the case where the operation rate of the instruction memory is lower than the operation rate of the processor, an instruction cache is additionally installed outside an integer core. Therefore, the fetch stage 110 first searches the instruction cache to fetch the instruction. If the instruction does not exist in the instruction cache, the fetch stage 110 accesses the instruction memory to fetch the instruction.

The decode stage 120 is an instruction decode (ID) stage which analyzes the instruction fetched by the fetch stage 110, generates control signals necessary for datapath components of the pipeline according to the instruction analysis, and fetches necessary operands.

In the decode stage 120, overall control is performed; and an operation of conversion into a control state machine, an operation of branch, and the like are performed.

In the decode stage 120, in the case of an operand process, inter-data dependency and hardware dependency are checked. If the dependency is inevitable, a bubble stage is generated. If the dependency is evitable, an operation of solving the dependency problem by using forwarding is performed.

In the execute stage 130, most arithmetic operations of the processor are performed (ALU), and an operation of generating data access addresses is performed.

In the memory stage 140, the processor accesses the data memory to perform operations READ/WRITE of reading and writing data.

In the case where the data memory rate is low, in general, since a data cache is additionally installed outside the integer core. Therefore, in the memory stage 140, the data cache is first searched to read and write data. If the data do not exist in the data cache, the processor accesses the data memory to read and write the data.

In the write-back stage 150, internal registers of the processor are updated with new data which are acquired as a result of the arithmetic operations or through the memory access.

Figure 4:
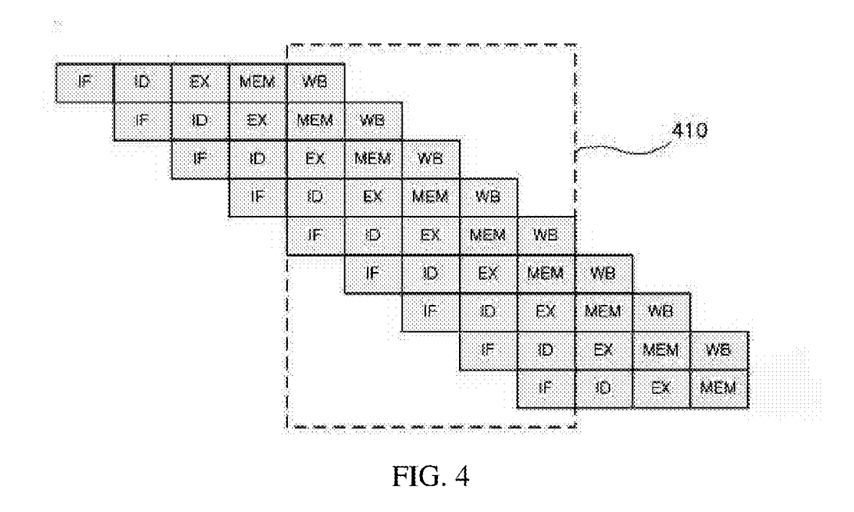
FIG. 4 is a diagram illustrating an instruction processing scheme in a pipelined processor.

FIG. 4 is a diagram illustrating an instruction processing scheme in a pipelined processor.

Referring to FIG. 4, it can be seen that, as an effect of the pipeline, one instruction is processed in one cycle in an area 410.

Referring to FIG. 1, the process is configured in a pipeline manner in order to increase a speed of the processor. In FIG. 1, a five-stage pipelined processor is illustrated.

In this case, the operating rate of the processor depends on a pipeline having the lowest operating rate among the pipelines.

In FIG. 1, the arrow of the flows Time1→ . . . →Time4 indicates that the manufacturing level of the processor is lowered in this order. As the manufacturing level of the processor is lowered, the change in the operating rate of the pipeline is indicated by the size of the arrow thereof.

Herein, the lowering of the manufacturing level of the process denotes that a reference linewidth in the process of manufacturing the processor with actual silicon chips is reduced. For example, the linewidth in the manufacturing process is reduced as 1 μm→0.8 μm→0.6 μm→0.35 μm→0.18 μm→90 μm→65 nm→45 nm→40 nm→35 nm→20 nm. This reduction in the linewidth is expressed by "the lowering of the manufacturing level of the process".

As the manufacturing level of the process is lowered, the following basic effects can be obtained when the processors manufactured in the same design.

First, as the linewidth is reduced, the moving distance of electrons is reduced, so that the operating rate is increased.

Second, as the linewidth is reduced, the area of the processor is reduced.

Third, as the area of the processor is reduced, the price of the processor manufactured with silicon is lowered.

In general, if the manufacturing level of the processor is lowered, the operating rate of the logic is proportionally increased. However, the operating rate of the memory is more slowly increased that the operating rate of the logic. As a result, the operation rates of the fetch stage 110 and memory stage 140 which are influenced by the instruction cache and data cache configured by using memories become relatively low. A multi-pipelined architecture processor is implemented in order to solve a delay in memory rate in such a processor.

Figure 2:
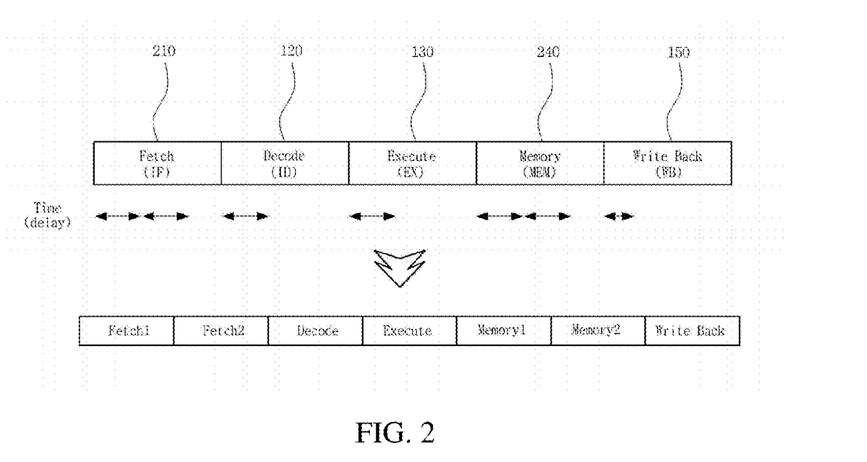
FIG. 2 is a diagram illustrating a pipeline structure with a multi-pipelined architecture.

FIG. 2 is a diagram illustrating a pipeline structure with a multi-pipelined architecture.

FIG. 2 illustrates a method of solving a delay in memory rate in an actual process.

In other words, in the multi-pipelined architecture, one cycle of the fetch stage 210 is further divided into two cycles or three cycles.

In addition, in the multi-pipelined architecture, the memory stage 240 may be further divided into an ALU pipeline, an MAC pipeline, an ROAD/STORE (Ld/St) pipeline, and the like.

As a similar concept of the multi-pipelined architecture, there is an architecture where the fetch stage and the memory stage are configured with multiple cycles.

Figure 3:
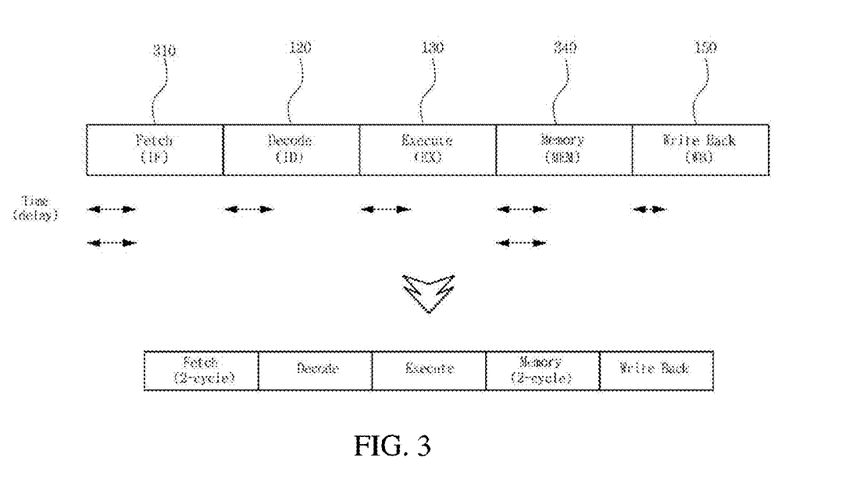
FIG. 3 is a diagram illustrating a pipeline structure with a multi-cycle architecture.

FIG. 3 is a diagram illustrating a pipeline structure with a multi-cycle architecture.

Referring to FIG. 3, each of a fetch stage 310 and a memory stage 340 is changed from a one-cycle manner to a two-cycle manner.

Figure 5:
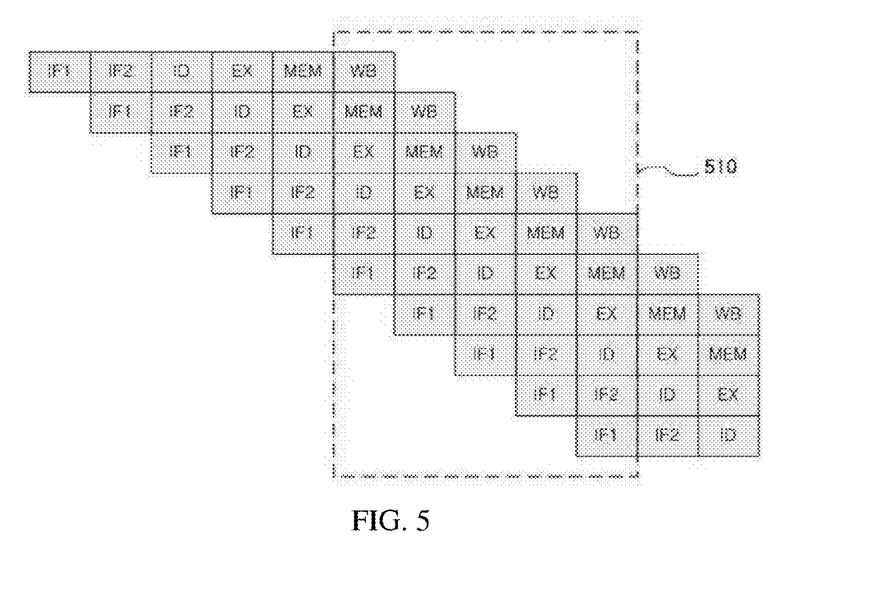
FIG. 5 is a diagram illustrating an instruction processing scheme in a multi-pipelined architecture processor.

FIG. 5 is a diagram illustrating an instruction processing scheme in a multi-pipelined architecture processor.

In the embodiment illustrated in FIG. 5, the fetch stage is configured in a multiple pipeline manner. In other words, in the multi-pipeline manner of the fetch stage, the fetch stage in an area 510 is configured to be two fetch stages IF1 and IF2. According to this configuration, the two fetch stages IF1 and IF2 can be simultaneously performed, so that there is an advantage in that performance and efficiency become high.

However, there is a disadvantage in that hardware logic for control and parallel process is increased.

Figure 6:
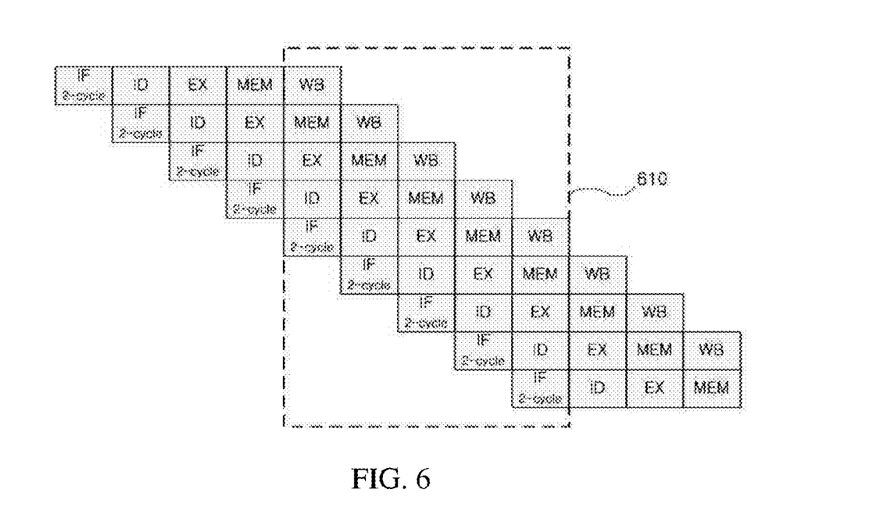
FIG. 6 is a diagram illustrating an instruction processing scheme in a multi-cycle architecture processor.

FIG. 6 is a diagram illustrating an instruction processing scheme in a multi-cycle architecture processor.

In the multi-cycle manner of the fetch stage, the fetch stage is configured with n cycles.

In the embodiment illustrated in FIG. 6, the fetch stage is configured in a multi-cycle manner. In other words, it can be seen that the fetch stage in an area 610 is configured with two cycles.

According to the configuration of the multi-cycle architecture processor, there is an advantage in that hardware logic is not almost increased. However, there is a disadvantage in that performance, that is, rate is decreased n times. Therefore, there is a need for another method to compensate for the decrease in the performance.

Figure 7:
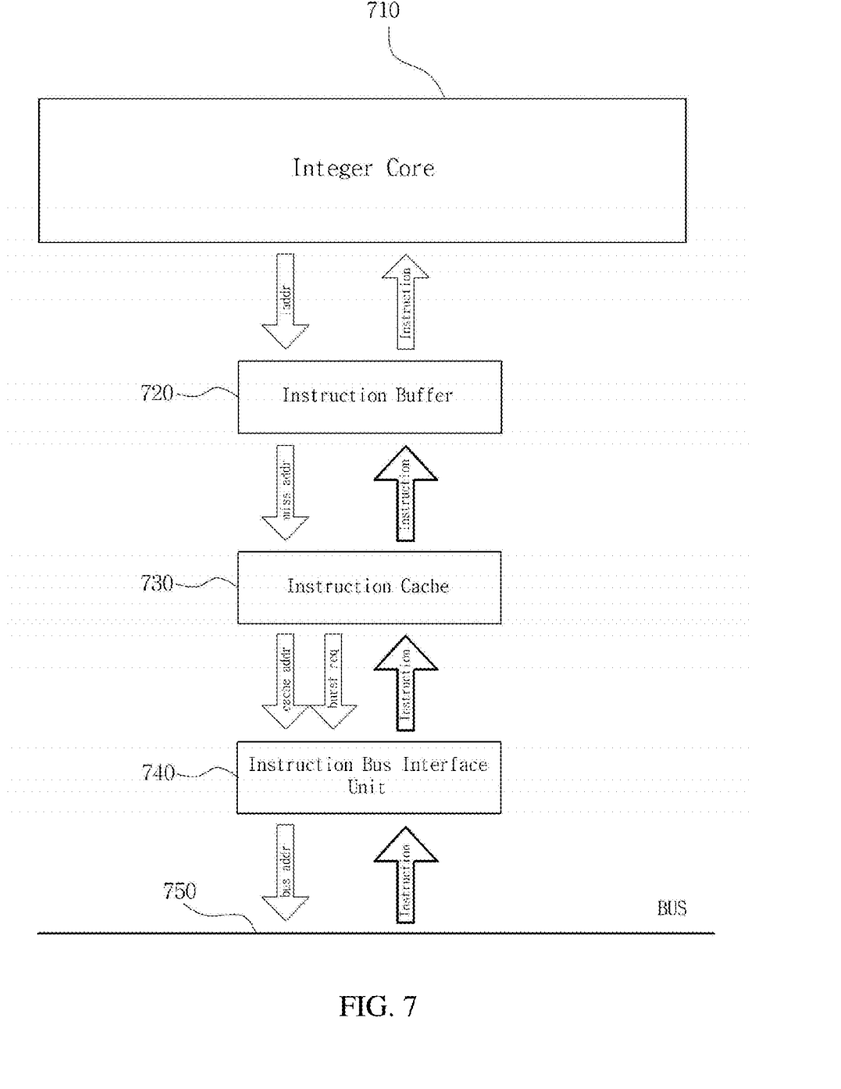
FIG. 7 is a block diagram illustrating a structure of a processor according to an embodiment of the present invention.

FIG. 7 is a block diagram illustrating a structure of a processor according to an embodiment of the present invention.

Referring to FIG. 7, a processor according to the embodiment of the present invention is configured to include an integer core 710, an instruction buffer 720, an instruction cache 730, and an instruction bus interface unit 740.

The integer core 710 is a block which reads an instruction and executes an operation corresponding to the instruction. In the embodiment of the present invention, the integer core 710 transmits an iaddr (Instruction Address) to a lower block in order to read the instruction and receives data corresponding to the iaddr to execute the operation.

The instruction buffer 720 stores instruction data which are requested by the integer core 710 using the iaddr and transmits the instruction data in response to the request of the integer core 710.

The instruction buffer 720 retains internal instruction data by using a self-prefetching method. In an actual case, since there is physical restriction to the size of the instruction buffer 720, there is a limitation to retain the data requested by the integer core 710 using the iaddr. Therefore, the instruction buffer 720 continues to perform the prefetching for filling the instruction buffer 720 with the instruction data which are to be requested later based on the current iaddr of the integer core 710. For example, during the prefetching, the instruction buffer 720 is filled with 128×4-bit data.

The instruction cache 730 stores a portion of data of a program memory.

In the embodiment of the present invention, the instruction cache 730 transmits the data of the instruction buffer 720, which are filled during the prefetching, to the instruction buffer 720.

Since there is also physical restriction on the size of the instruction cache 730, only a portion of the instruction data in the memory is stored in the instruction cache. In the case where the instruction data of the area which does not exist in the instruction cache 730 are requested, the memory is accessed to read the instruction data, and the instruction cache 730 is filled with the instruction data. For example, the instruction cache 730 is filed with 128×4-bit data which are read from the memory.

The instruction bus interface unit 740 is a block which changes an internal interface into a bus interface 750 in order to directly access the memory.

In the present invention, the instruction buffer 720 and the instruction cache 730 are different in terms of size and repose cycle. In other words, the instruction buffer 720 stores a smaller amount of the instruction data than the instruction cache 730, and the instruction data of the integer core 710 can be transmitted without delay. On the contrary, the instruction cache 730 stores a larger amount of the instruction data than the instruction buffer 720, and N cycles are needed to output internal data of the instruction cache 730.

In the process with a multi-pipeline fetch structure and the processor with a multi-cycle cache structure, the portion of fetching data from a memory is configured with multiple cycles. Therefore, the performance of the processor is inversely proportional to the number of multiple cycles.

According to the present invention, in this case, in order to improve the performance during the instruction fetching, the instruction buffer 720 is added between the integer core 710 and the instruction cache 730.

Figure 8:
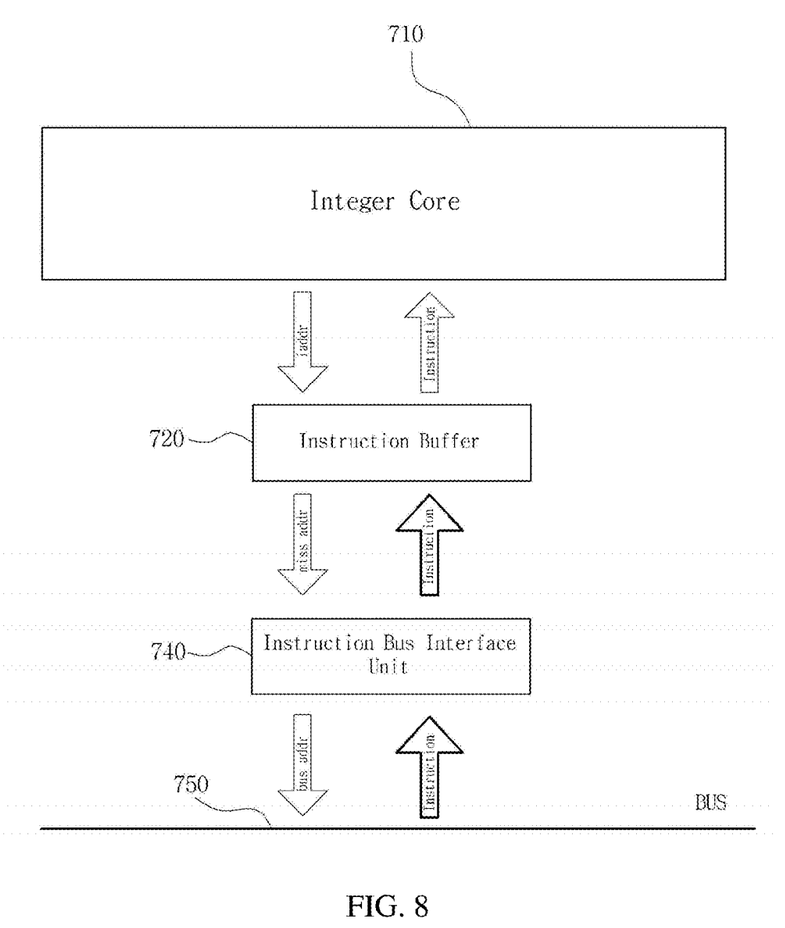
FIG. 8 is a block diagram illustrating a structure of a processor according to another embodiment of the present invention.

FIG. 8 is a block diagram illustrating a structure of a processor according to another embodiment of the present invention. In the structure of the process according to the embodiment illustrated in FIG. 8, the instruction cache 730 illustrated in FIG. 7 is not included.

Referring to FIG. 8, the processor according to another embodiment of the present invention is configured to include an integer core 710, an instruction buffer 720, and an instruction bus interface unit 740.

The integer core 710 is a block which reads and processes an instruction. In the embodiment of the present invention, the integer core 710 transmits iaddr to a lower block in order to read the instruction and receives data corresponding to the iaddr to perform an operation.

The instruction buffer 720 stores instruction data which are requested with the iaddr by the integer core 710 and transmits the instruction data in response to the request of the integer core 710.

The instruction buffer 720 retains internal instruction data by using a self-prefetching method. In an actual case, since there is physical restriction on the size of the instruction buffer 720, there is a limitation in retaining the data requested by the integer core 710 using the iaddr. Therefore, the instruction buffer 720 continues to perform the prefetching for filling the instruction buffer 720 with the instruction data which are to be requested later based on the current iaddr of the integer core 710. For example, during the prefetching, the instruction buffer 720 is filled with 128×4-bit data.

The instruction bus interface unit 740 is a block which changes an internal interface to a bus interface 750 in order to directly access the memory.

Figure 9:
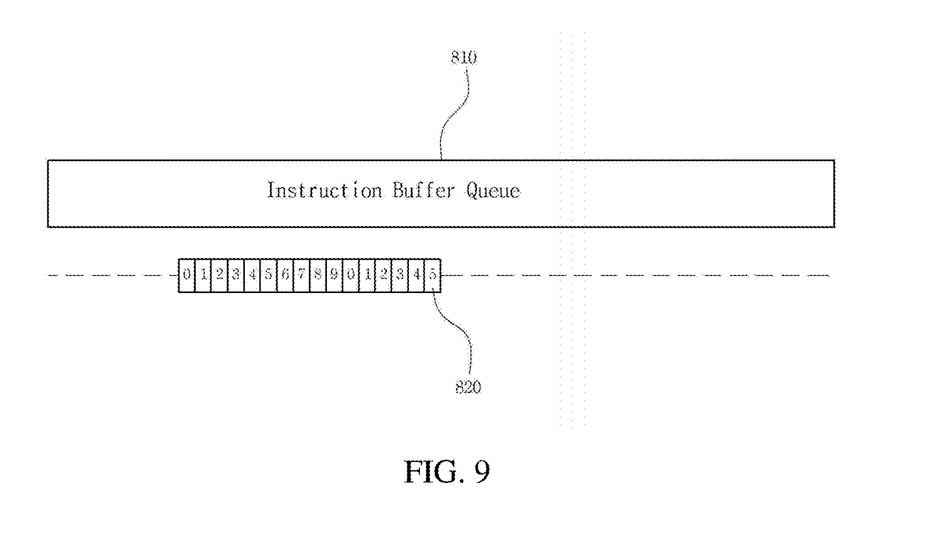
FIG. 9 is a diagram illustrating prefetching of an instruction buffer according to an embodiment of the present invention.

FIG. 9 is a diagram illustrating prefetching of an instruction buffer according to an embodiment of the present invention.

Referring to FIG. 9, a sliding window for the prefetching of the instruction buffer 720 exists. The prefetching method is a method of filling the instruction buffer 720 with data in advance before the requesting of the integer core 710.

In the embodiment, the empty area in the instruction buffer 720 is checked, and the prefetching is performed in order to fill the empty area. If logic of simultaneously checking all the areas is configured in a hardware manner, the size of the logic becomes very large. Therefore, in the present invention, the size of the areas which can be sequentially accessed is designated with reference to the currently-accessed area, and only the areas are checked. These areas are called sliding windows.

In the present invention, the empty sliding windows in the instruction buffer 720 are checked, and the prefetching is performed to fill the empty sliding windows with data. If the currently-accessed area is changed, the start and end points of the sliding window are also changed.

In the present invention, since the instruction buffer 720 is hardware of which the size is limited, a hashing method is used to represent all the instruction data which are requested by the integer core 710. In the embodiment of the present invention, the most significant 20 bits of the iaddr may be used as a tag, and the least significant bits of the iaddr may be used as an index to search for the data in the instruction buffer 720. The embodiment of the present invention can be configured so that four words can be managed as one tag.

Figure 10:
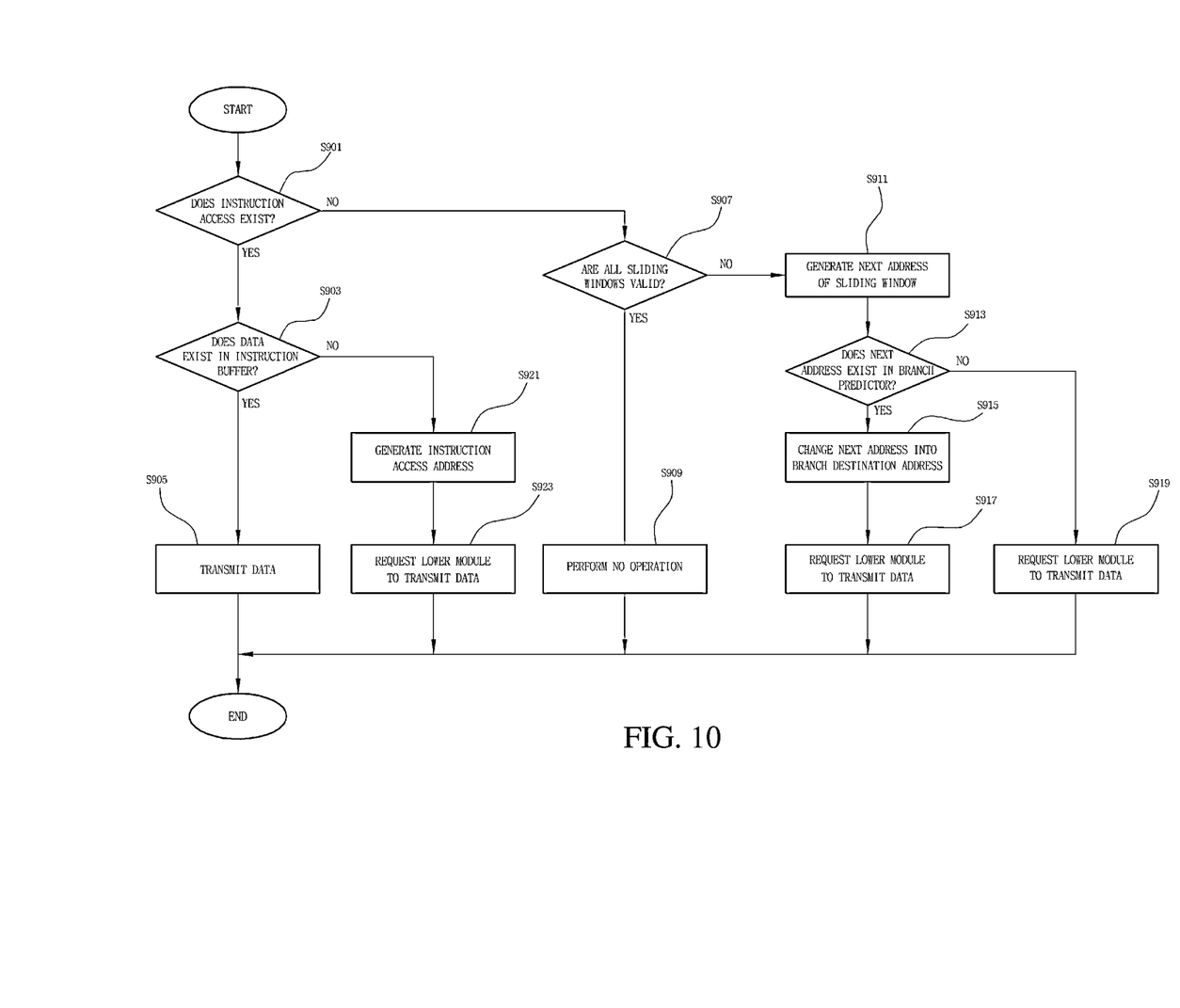
FIG. 10 is a flowchart illustrating a method of controlling an instruction buffer according to an embodiment of the present invention.

FIG. 10 is a flowchart illustrating a method of controlling an instruction buffer according to an embodiment of the present invention.

Referring to FIG. 10, a processor checks whether or not instruction access exists (Step S901).

If the instruction access exists, it is checked whether or not the corresponding data exists in the instruction buffer 720 (Step S903).

If the corresponding data exists in the instruction buffer 720, the corresponding data are transmitted (Step S905). If the corresponding data does not exist in the instruction buffer 720 in Step S903, an instruction access address is generated (Step S921). Next, a lower module is requested to transmit the instruction data (Step S923).

If the instruction access does not exist in Step S901, it is checked whether or not all sliding windows are valid (Step S907). If all the sliding windows are valid, no operation is performed (Step S909).

If all the sliding windows are not valid, a next address of the sliding windows is generated (Step S911).

Next, it is checked whether or not the next address exists in a branch predictor (Step S913). If the next address exists in the branch predictor, the next address is changed into a branch destination address (Step S915). Next, the lower module is requested to transmit the data (Step S915).

If the next address does not exist in the branch predictor in Step S913, the lower module is requested to transmit the data (Step S919).

Hereinbefore, several exemplary embodiments of the present invent are described, but the present invention is analyzed in a limitative sense. It will be understood by the ordinarily skilled in the art that various changes in form and details may be made therein without departing from the spirit and scope of the present invention as defined by the appended claims.

What is claimed is:

1. A processor with a multi-pipeline fetch structure or a multi-cycle cache structure, comprising:
    an integer core which reads instruction transmitted from an instruction buffer, executes an operation corresponding to the instruction, and transmits an instruction address to the instruction buffer;
    the instruction buffer which stores instruction data which are requested by the integer core by using the instruction address and transmits the instruction data in response to the request of the integer core; and
    an instruction cache which stores a portion of data of a program memory and transmit the data to the instruction buffer in response to the request of the instruction buffer.

2. The processor according to claim 1, wherein the processor employs a prefetching method of filling the instruction buffer with data in advance before the requesting of the integer core.

3. The processor according to claim 2, wherein the processor checks an empty area of the instruction buffer and uses a prefetching method to fill the empty area.

4. The processor according to claim 3, wherein, when areas of the instruction buffer which can be sequentially accessed with reference to a currently-accessed area are defined by sliding windows, the processor may use the prefetching method where the sliding windows are designated and the checking is performed.

5. A processor with a multi-pipeline fetch structure or a multi-cycle cache structure, comprising:
    an integer core which reads instruction transmitted from an instruction buffer, executes an operation corresponding to the instruction, and transmits an instruction address to the instruction buffer; and
    the instruction buffer which stores instruction data which are requested by the integer core by using the instruction address and transmits the instruction data in response to the request of the integer core.

6. The processor according to claim 5, wherein the processor employs a prefetching method of filling the instruction buffer with data in advance before the requesting of the integer core.

7. The processor according to claim 6, wherein the processor checks an empty area of the instruction buffer and uses a prefetching method to fill the empty area.

8. The processor according to claim 7, wherein, when areas of the instruction buffer which can be sequentially accessed with reference to a currently-accessed area are defined by sliding windows, the processor may use the prefetching method where the sliding windows are designated and the checking is performed.

* * * * *